United States Patent
Romig et al.

(10) Patent No.: US 11,584,806 B2
(45) Date of Patent: Feb. 21, 2023

(54) METHODS FOR CHROMIUM CATALYST ACTIVATION USING OXYGEN-ENRICHED FLUIDIZATION GAS

(71) Applicant: Chevron Phillips Chemical Company LP, The Woodlands, TX (US)

(72) Inventors: Ralph W Romig, Kingwood, TX (US); James E. Hein, Houston, TX (US); Troy Bretz, Tomball, TX (US); Zhihui Gu, Houston, TX (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 198 days.

(21) Appl. No.: 17/179,475

(22) Filed: Feb. 19, 2021

(65) Prior Publication Data
US 2022/0267485 A1    Aug. 25, 2022

(51) Int. Cl.
| | | |
|---|---|---|
| *B01J 31/34* | (2006.01) | |
| *B01J 21/08* | (2006.01) | |
| *C08F 4/78* | (2006.01) | |
| *C08F 10/02* | (2006.01) | |
| *C08F 210/16* | (2006.01) | |
| *C08F 4/24* | (2006.01) | |
| *C08F 4/02* | (2006.01) | |

(52) U.S. Cl.
CPC ............... *C08F 4/24* (2013.01); *B01J 31/34* (2013.01); *C08F 4/02* (2013.01); *C08F 10/02* (2013.01); *B01J 21/08* (2013.01); *C08F 4/78* (2013.01); *C08F 210/16* (2013.01)

(58) Field of Classification Search
CPC ..... B01J 31/34; C08F 4/78; C08F 4/02; C08F 4/24
See application file for complete search history.

(56) References Cited

U.S. PATENT DOCUMENTS

| | | | |
|---|---|---|---|
| 3,242,099 A | 3/1966 | Manyik | |
| 3,248,179 A | 4/1966 | Norwood | |
| 3,635,840 A * | 1/1972 | Hinton | C08F 36/04 502/154 |
| 4,136,061 A * | 1/1979 | Hogan | B01J 8/28 526/98 |
| 4,151,122 A * | 4/1979 | McDaniel | C08F 10/00 502/236 |

(Continued)

OTHER PUBLICATIONS

International Search Report and Written Opinion issued in application No. PCT/US2022/070622 dated Jun. 9, 2022, 11 pp.

(Continued)

*Primary Examiner* — Rip A Lee
(74) *Attorney, Agent, or Firm* — Merchant & Gould P.C.

(57) ABSTRACT

Processes for producing an activated chromium catalyst are disclosed, and these processes comprise contacting a supported chromium catalyst with a gas stream containing from 25-60 vol % oxygen at a peak activation temperature of 550-900° C. to produce the activated chromium catalyst. The linear velocity of the gas stream is 0.18-0.4 ft/sec, and the oxygen linear velocity of the gas stream is 0.05-0.15 ft/sec. The resultant activated chromium catalyst and an optional co-catalyst can be contacted with an olefin monomer and an optional olefin comonomer in a polymerization reactor system under polymerization conditions to produce an olefin polymer.

20 Claims, 3 Drawing Sheets

(56) References Cited

U.S. PATENT DOCUMENTS

| | | | | |
|---|---|---|---|---|
| 4,248,735 | A | * | 2/1981 | McDaniel ............... B01J 37/12 526/98 |
| 4,284,527 | A | * | 8/1981 | Pullukat ................. C08F 10/00 502/154 |
| 4,501,885 | A | | 2/1985 | Sherk |
| 4,588,790 | A | | 5/1986 | Jenkins, III |
| 4,794,096 | A | | 12/1988 | Ewen |
| 4,808,561 | A | | 2/1989 | Welborn, Jr. |
| 5,352,749 | A | | 10/1994 | Dechellis |
| 5,436,304 | A | | 7/1995 | Griffin |
| 5,565,175 | A | | 10/1996 | Hottovy |
| 5,575,979 | A | | 11/1996 | Hanson |
| 5,576,259 | A | | 11/1996 | Hasegawa |
| 5,807,938 | A | | 9/1998 | Kaneko |
| 5,919,983 | A | | 7/1999 | Rosen |
| 6,239,235 | B1 | | 5/2001 | Hottovy |
| 6,262,191 | B1 | | 7/2001 | Hottovy |
| 6,734,131 | B2 | * | 5/2004 | Shih ........................ C08F 10/00 502/84 |
| 6,833,415 | B2 | | 12/2004 | Kendrick |
| 6,989,344 | B2 | * | 1/2006 | Cann ....................... C08F 10/00 502/154 |
| 7,223,823 | B2 | * | 5/2007 | Lin .......................... C08F 10/00 526/348.2 |
| 7,294,599 | B2 | | 11/2007 | Jensen |
| 7,531,606 | B2 | | 5/2009 | Hendrickson |
| 7,598,327 | B2 | | 10/2009 | Shaw |
| 7,601,665 | B2 | | 10/2009 | McDaniel |
| 7,615,510 | B2 | * | 11/2009 | McDaniel ............... B01J 37/08 502/305 |
| 7,884,163 | B2 | | 2/2011 | McDaniel |
| 7,915,357 | B2 | | 3/2011 | Cann |
| 8,114,353 | B2 | * | 2/2012 | Benham .................. B01J 23/92 422/600 |
| 8,114,946 | B2 | | 2/2012 | Yang |
| 8,309,485 | B2 | | 11/2012 | Qing |
| 8,372,771 | B2 | * | 2/2013 | Benham .................. B01J 37/08 502/49 |
| 8,623,973 | B1 | | 1/2014 | McDaniel |
| 8,703,886 | B1 | | 4/2014 | Qing |
| 8,822,608 | B1 | | 9/2014 | Bhandarkar |
| 9,023,959 | B2 | | 5/2015 | McDaniel |
| 10,287,369 | B2 | * | 5/2019 | Schwerdtfeger ..... B01J 35/1038 |
| 2018/0305473 | A1 | | 10/2018 | Schwerdtfeger |
| 2020/0010590 | A1 | | 1/2020 | Moorhouse |

OTHER PUBLICATIONS

C.S. Kim, et al., "Characterization of Cr/Silica Ethylene Polymerization Catalyst by TPO/TPR and FT-IR," Journal of Molecular Catalysis, vol. 73, Jan. 13, 1992, pp. 249-263.

J.P. Hogan, "Ethylene Polymerization Catalysis Over Chromium Oxide," Journal of Polymer Science: Part A-1, vol. 8, 1970, pp. 2637-2652.

S.M. Augustine, et al., "A Proposed Mechanism for Silica Supported Chromium HDPE Catalyst Activation," Journal of Catalysis, vol. 161, Article No. 0226, Mar. 18, 1996, pp. 41-650.

V.J. Ruddick, et al., "Mechanistic Study of the Calcination of Supported Chromium(III) Precursors for Ethene Polymerization Catalysts," J. Phys. Chem., 100, 1996, pp. 11062-11066.

Brunauer, et al., "Adsorption of Gases in Multimolecular Layers," Journal of the American Chemical Society. 1938, vol. 60, pp. 309-319.

Cotton, F. Albert, et al., "Advanced Inorganic Chemistry," Sixth Edition, cover page, title page, pp. ix-x, and book description, Mar. 30, 1999, John Wiley & Sons, Inc.

Film Extrusion Manual—Process, Materials, Properties, TAPPI Press, 1992, 16 pages.

Hawley's Condensed Chemical Dictionary, Eleventh Edition, cover page, contents page, pp. 862-863, Van Nostrand Reinhold Company, 1987.

IUPAC Compendium of Chemical Terminology, 2nd Ed. 1997, pp. 1-1670.

M. P. McDaniel, "Ethylene Polymerization Over Chromium Oxide Catalysts," Advances in Catalysts, vol. 33, pp. 47-98, 1995.

M. P. McDaniel, et al., "The Activation of the Phillips Polymerization Catalysts, I. The Influence of the Hydroxyl Population," Journal of Catalysis, vol. 82, p. 98, 1983.

M.P. McDaniel, "The State of Cr on the Phillips Polymerization Catalyst," Transition Metal Catalyzed Polymerizations, Alkenes and Dienes, Editor Roderic P. Quirk, MMI Press, vol. 4, Part B, p. 713, 1983.

M.P. McDaniel, "The State of Cr(VI) on the Cr/Silica Polymerization Catalyst," Journal of Catalysis, vol. 67, p. 71, 1981.

M.P. McDaniel, "The State of Cr(VI) on the Phillips Polymerization Catalyst IV. Saturation Coverage," Journal of Catalysis, vol. 76, p. 37, 1982.

M.P. McDaniel, "The State of Cr(VI) on the Phillips Polymerization Catalysts II. The Reaction Between Silica and Chromyl Chloride," Journal of Catalysis, vol. 76, p. 17, 1982.

M.P. McDaniel, et al., "Excess Oxygen of Chromia, I.," Journal of Catalysis, vol. 36, p. 394, 1975.

M.P. McDaniel, et al., "Excess Oxygen of Chromia, II. Reaction With Diphenylpicrylhydrazine," Journal of Catalysis, vol. 36, p. 404, 1975.

M.P. McDaniel, et al., "Long Chain Branching in Polyethylene From the Phillips Chromium Catalyst," Polymer Reaction Engineering vol. 11, No. 2, pp. 105-135, 2003.

M.P. McDaniel, et al., "The Activation of the Phillips Polymerization Catalyst, II. Activation by Reduction/Reoxidation," Journal of Catalysis, vol. 82, p. 110, 1983.

M.P. McDaniel, et al., "The Activation of the Phillips Polymerization Catalyst: I. Influence of the Silanol Population," Org. Coat. Appl. Polym. Sci. Proc., vol. 46, pp. 708-713, 1981.

M.P. McDaniel, et al., "The Influence of Hydroxyls on the Cr/Silica Polymerization Catalyst," Initiation of Polymerization, Editor Frederick E. Bailey, Jr., A.C.S. Symposium Series 212, Paper 15, p. 191, Las Vegas, 1983.

McDaniel, M. P., et al., The State of Cr(VI) on the Phillips Polymerization Catalyst, Journal of Catalysis, 1982, pp. 29-36, vol. 76, Academic Press, Inc.

Modern Plastics Encyclopedia, Mid-Nov. 1995 Issue, vol. 72, No. 12, 3 pages.

* cited by examiner

METHODS FOR CHROMIUM CATALYST ACTIVATION USING OXYGEN-ENRICHED FLUIDIZATION GAS

FIELD OF THE INVENTION

The present disclosure generally relates to methods for activating supported chromium catalysts, and more particularly, relates to performing such methods with an oxygen-enriched fluidization gas.

BACKGROUND OF THE INVENTION

Supported chromium catalysts are activated by exposure to an oxygen-containing atmosphere (e.g., air) at elevated temperatures to convert at least a portion of lower valence chromium to an oxidation state of +6 (hexavalent chromium). However, in commercial practice, activation of large quantities of supported chromium catalysts often results in relatively low conversion to Cr(VI), which is undesirable. Accordingly, it is to these ends that the present invention is generally directed.

SUMMARY OF THE INVENTION

This summary is provided to introduce a selection of concepts in a simplified form that are further described below in the detailed description. This summary is not intended to identify required or essential features of the claimed subject matter. Nor is this summary intended to be used to limit the scope of the claimed subject matter.

Aspects of this invention are directed to processes for producing an activated (or calcined) chromium catalyst, and such processes can comprise contacting a supported chromium catalyst with a gas stream comprising from 25 to 60 vol % oxygen at a peak activation temperature of from 550° C. to 900° C. to produce the activated chromium catalyst. Generally, at the peak activation temperature, the linear velocity of the gas stream falls within a range from 0.18 to 0.4 ft/sec, and the oxygen linear velocity of the gas stream falls within a range from 0.05 to 0.15 ft/sec.

Olefin polymerization processes also are provided herein. These polymerization processes can comprise (i) performing any process to produce the activated chromium catalyst disclosed herein, and (ii) contacting the activated chromium catalyst and an optional co-catalyst with an olefin monomer and an optional olefin comonomer in a polymerization reactor system under polymerization conditions to produce an olefin polymer.

Both the foregoing summary and the following detailed description provide examples and are explanatory only. Accordingly, the foregoing summary and the following detailed description should not be considered to be restrictive. Further, features or variations may be provided in addition to those set forth herein. For example, certain aspects may be directed to various feature combinations and sub-combinations described in the detailed description.

BRIEF DESCRIPTION OF THE FIGURES

The following figures form part of the present specification and are included to further demonstrate certain aspects of the present invention. The invention may be better understood by reference to one or more of these figures in combination with the detailed description of specific embodiments presented herein.

Figure 1:
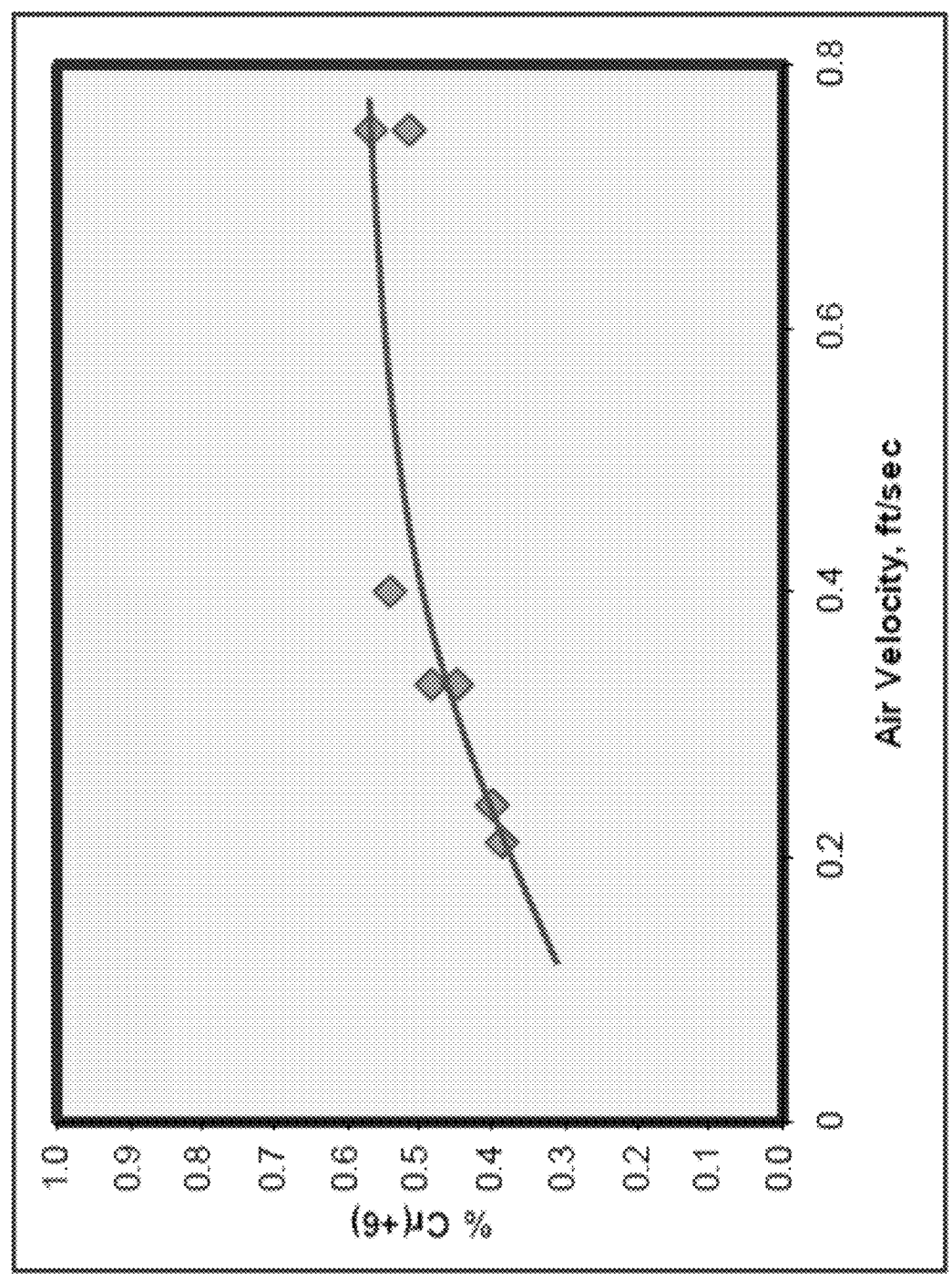
FIG. 1 presents a plot of Cr(VI) content as a function of air velocity (ft/sec) in a large-scale activator for supported chromium catalysts.

While the inventions disclosed herein are susceptible to various modifications and alternative forms, only a few specific embodiments have been shown by way of example in the drawings and are described in detail below. The figures and detailed descriptions of these specific embodiments are not intended to limit the breadth or scope of the inventive concepts or the appended claims in any manner. Rather, the figures and detailed written descriptions are provided to illustrate the inventive concepts to a person of ordinary skill in the art and to enable such person to make and use the inventive concepts.

Definitions

To define more clearly the terms used herein, the following definitions are provided. Unless otherwise indicated, the following definitions are applicable to this disclosure. If a term is used in this disclosure but is not specifically defined herein, the definition from the IUPAC Compendium of Chemical Terminology, $2^{nd}$ Ed (1997), can be applied, as long as that definition does not conflict with any other disclosure or definition applied herein, or render indefinite or non-enabled any claim to which that definition is applied. To the extent that any definition or usage provided by any document incorporated herein by reference conflicts with the definition or usage provided herein, the definition or usage provided herein controls.

Herein, features of the subject matter are described such that, within particular aspects, a combination of different features can be envisioned. For each and every aspect and each and every feature disclosed herein, all combinations that do not detrimentally affect the catalysts, compositions, processes, or methods described herein are contemplated with or without explicit description of the particular combination. Additionally, unless explicitly recited otherwise, any aspect or feature disclosed herein can be combined to describe inventive catalysts, compositions, processes, or methods consistent with the present disclosure.

Generally, groups of elements are indicated using the numbering scheme indicated in the version of the periodic table of elements published in Chemical and Engineering News, 63(5), 27, 1985. In some instances, a group of elements can be indicated using a common name assigned to the group; for example, alkali metals for Group 1 elements, alkaline earth metals for Group 2 elements, transition metals for Group 3-12 elements, and halogens or halides for Group 17 elements.

The term "hydrocarbon" whenever used in this specification and claims refers to a compound containing only carbon and hydrogen, whether saturated or unsaturated. Other identifiers can be utilized to indicate the presence of particular groups in the hydrocarbon (e.g., halogenated hydrocarbon indicates the presence of one or more halogen atoms replacing an equivalent number of hydrogen atoms in the hydrocarbon). Non-limiting examples of hydrocarbons include alkanes (linear, branched, and cyclic), alkenes (olefins), and aromatics, among other compounds.

For any particular compound or group disclosed herein, any name or structure (general or specific) presented is intended to encompass all conformational isomers, regioisomers, stereoisomers, and mixtures thereof that can arise from a particular set of substituents, unless otherwise specified. The name or structure (general or specific) also encompasses all enantiomers, diastereomers, and other optical isomers (if there are any) whether in enantiomeric or racemic forms, as well as mixtures of stereoisomers, as would be recognized by a skilled artisan, unless otherwise specified. For instance, a general reference to pentane includes n-pentane, 2-methyl-butane, and 2,2-dimethylpropane; and a general reference to a butyl group includes a n-butyl group, a sec-butyl group, an iso-butyl group, and a t-butyl group.

Unless otherwise specified, the term "substituted" when used to describe a group, for example, when referring to a substituted analog of a particular group, is intended to describe any non-hydrogen moiety that formally replaces a hydrogen in that group, and is intended to be non-limiting. Also, unless otherwise specified, a group or groups can also be referred to herein as "unsubstituted" or by equivalent terms such as "non-substituted," which refers to the original group in which a non-hydrogen moiety does not replace a hydrogen within that group. Moreover, unless otherwise specified, "substituted" is intended to be non-limiting and include inorganic substituents or organic substituents as understood by one of ordinary skill in the art.

The terms "contacting" and "combining" are used herein to describe catalysts, compositions, processes, and methods in which the materials or components are contacted or combined together in any order, in any manner, and for any length of time, unless otherwise specified. For example, the materials or components can be blended, mixed, slurried, dissolved, reacted, treated, impregnated, compounded, or otherwise contacted or combined in some other manner or by any suitable method or technique.

"BET surface area" as used herein means the surface area as determined by the nitrogen adsorption Brunauer, Emmett, and Teller (BET) method according to ASTM D1993-91, and as described, for example, in Brunauer, S., Emmett, P. H., and Teller, E., "Adsorption of gases in multimolecular layers," J. Am. Chem. Soc., 60, 3, pp. 309-319, the contents of which are expressly incorporated by reference herein.

In this disclosure, while catalysts, compositions, processes, and methods are described in terms of "comprising" various components or steps, the catalysts, compositions, processes, and methods also can "consist essentially of" or "consist of" the various components or steps, unless stated otherwise.

The terms "a," "an," and "the" are intended to include plural alternatives, e.g., at least one. For instance, the disclosure of "a solid oxide" is meant to encompass one, or mixtures or combinations of more than one, solid oxide unless otherwise specified.

Several types of ranges are disclosed in the present invention. When a range of any type is disclosed or claimed, the intent is to disclose or claim individually each possible number that such a range could reasonably encompass, including end points of the range as well as any sub-ranges and combinations of sub-ranges encompassed therein. For example, the gas stream can contain a range of oxygen contents in aspects of this invention. By a disclosure that the gas stream can contain 25 to 60 vol % oxygen, the intent is to recite that the oxygen content can be any amount in the range and, for example, can include any range or combination of ranges from 25 to 60 vol %, such as from 25 to 55 vol %, from 25 to 50 vol %, from 25 to 45 vol %, from 30 to 60 vol %, from 30 to 50 vol %, from 30 to 40 vol %, or from 35 to 55 vol % oxygen, and so forth. Likewise, all other ranges disclosed herein should be interpreted in a manner similar to this example.

In general, an amount, size, formulation, parameter, range, or other quantity or characteristic is "about" or "approximate" whether or not expressly stated to be such. Whether or not modified by the term "about" or "approximately," the claims include equivalents to the quantities or characteristics.

Although any methods, devices, and materials similar or equivalent to those described herein can be used in the practice or testing of the invention, the typical methods, devices, and materials are herein described.

All publications and patents mentioned herein are incorporated herein by reference for the purpose of describing and disclosing, for example, the constructs and methodologies that are described in the publications, which might be used in connection with the presently described invention.

DETAILED DESCRIPTION OF THE INVENTION

The present invention is generally directed to the conversion of lower valence supported chromium catalysts to activated (hexavalent) chromium catalysts, which are subsequently used in olefin polymerization processes. Herein, the supported (lower valence) chromium catalyst is contacted with a gas stream comprising from 25 to 60 vol % oxygen at a peak activation temperature of from 550° C. (1022° F.) to 900° C. (1652° F.) to produce the activated chromium catalyst. At the peak activation temperature, the linear velocity of the gas stream is in a range from 0.18 ft/sec to 0.4 ft/sec (0.055 m/sec to 0.122 m/sec), while the oxygen linear velocity of the gas stream is in a range from 0.05 ft/sec to 0.15 ft/sec (0.015 m/sec to 0.046 m/sec).

High velocity fluidizing air streams—such as 0.5 ft/sec and above—are beneficial for higher Cr(VI) conversions, due in part to concurrently driving off water/moisture released during the activation process while also maintaining the chromium in the Cr(VI) state, e.g., preventing reversion to lower valence chromium at elevated temperatures. While these high linear velocities of air streams—such as 0.5 ft/sec and above—are beneficial for higher Cr(VI) conversions, mechanical equipment and pressure limitations in commercial operations generally make achieving 0.5+ft/sec air velocities impossible. In many cases, maximum velocities are limited to 0.4 ft/sec, such as 0.32 ft/sec and below. Often, the mechanical equipment and pressure constraints are much more severe, such that gas stream velocities only in the 0.18-0.25 ft/sec range are achievable.

A key objective of this invention is to achieve similar chromium conversions to conventional air streams (~21 vol % oxygen) by increasing the oxygen content of the gas stream to compensate for lower overall gas stream velocities (~0.18-0.4 ft/sec) where mechanical equipment and pressure limitations exists. Oxygen levels in the gas stream can be increased to ~25-60 vol % to compensate for the lower overall gas stream velocity. For example, the oxygen linear velocity of a 0.5 ft/sec gas stream containing 21 vol % oxygen equates to 0.105 ft/sec. In an activation process where equipment/pressure constraints limit the overall gas stream velocity to 0.3 ft/sec, the oxygen content of the fluidizing gas stream can be increased to 35 vol % to reach an equivalent oxygen linear velocity of 0.105 ft/sec.

Regardless of the overall gas velocity, chromium catalyst activation processes are very energy intensive and the overall cycle times are very lengthy. Beneficially, the disclosed processes allow the overall activation conditions to remain unchanged—the overall cycle time and peak activation temperatures do not need to be increased in order to compensate for the lower overall gas stream velocity.

Processes for Activating Chromium Catalysts

Disclosed herein are processes for producing an activated (or calcined) chromium catalyst. These processes can comprise contacting a supported chromium catalyst with a gas stream comprising from 25 to 60 vol % oxygen at a peak activation temperature of from 550° C. to 900° C. to produce the activated chromium catalyst. The linear velocity of the gas stream can be in a range from 0.18 to 0.4 ft/sec, while the oxygen linear velocity of the gas stream can be in a range from 0.05 to 0.15 ft/sec.

Generally, the features of this process (e.g., the supported chromium catalyst, the activated chromium catalyst, the gas stream composition, the linear velocity of the gas stream, the oxygen linear velocity of the gas stream, and the peak temperature, among others) are independently described herein and these features can be combined in any combination to further describe the disclosed processes to produce activated chromium catalysts. Moreover, additional process steps can be performed before, during, and/or after any of the steps in any of the processes disclosed herein, and can be utilized without limitation and in any combination to further describe these processes, unless stated otherwise. Further, any activated chromium catalysts produced in accordance with the disclosed processes are within the scope of this disclosure and are encompassed herein.

The peak activation temperature that is used to form the activated chromium catalyst typically falls in the range of 550° C. to 900° C., and this can vary depending, for instance, on the nature of the supported chromium catalyst (and its support, e.g., silica or silica-titania) and the duration of time at the peak activation temperature (often referred to as the hold time or soak time). Thus, non-limiting and illustrative ranges for the peak activation temperature can include from 550° C. to 800° C., from 600° C. to 900° C., from 600° C. to 871° C., from 600° C. to 800° C., from 650° C. to 900° C., from 650° C. to 800° C., from 700° C. to 900° C., from 700° C. to 850° C., or from 750° C. to 871° C., and the like. These temperature ranges also are meant to encompass circumstances where the activation process is performed at a series of different temperatures, instead of at a single fixed temperature, falling within the respective peak activation temperature ranges, wherein at least one temperature is within the recited ranges.

The hold time (or soak time) at the peak activation temperature is not particularly limited, but generally falls within a range from 1 to 30 hr. In one aspect, the hold time (or soak time) at the peak activation temperature can be in the 3 to 20 hr range, from 4 to 20 hr in another aspect, from 4 to 10 hr in yet another aspect, and from 5 to 15 hr in still another aspect. As one of skill in the art would recognize, the hold time can vary based on the peak activation temperature, among other variables.

An oxygen-enriched gas stream is used in the disclosed processes, with the oxygen content being greater than that found in a traditional air stream. In one aspect, the amount of oxygen in the fluidizing gas stream can be from 25 to 60 vol % oxygen, while in another aspect, the gas stream can contain from 25 to 55 vol % oxygen (or from 25 to 50 vol % oxygen, or from 25 to 45 vol % oxygen), and in yet another aspect, the gas stream can contain from 30 to 60 vol % oxygen (or from 30 to 50 vol % oxygen, or from 30 to 40 vol % oxygen), and in still another aspect, the gas stream can contain from 35 to 55 vol % oxygen (or from 35 to 50 vol % oxygen).

The linear velocity of the gas stream in the disclosed activation processes falls within a range from 0.18 to 0.4 ft/sec. In one aspect, for instance, the linear velocity of the gas stream can range from 0.18 to 0.35 ft/sec, from 0.18 to 0.33 ft/sec, or from 0.18 to 0.3 ft/sec. In another aspect, the linear velocity can range from 0.2 to 0.38 ft/sec, from 0.2 to 0.33 ft/sec, from 0.2 to 0.3 ft/sec, or from 0.2 to 0.27 ft/sec. In yet another aspect, the linear velocity can range from 0.22 to 0.4 ft/sec, from 0.22 to 0.35 ft/sec, from 0.22 to 0.32 ft/sec, or from 0.22 to 0.3 ft/sec. In still another aspect, the linear velocity can range from 0.25 to 0.38 ft/sec, from 0.25 to 0.35 ft/sec, or from 0.25 to 0.32 ft/sec.

Notwithstanding the oxygen content of the gas stream and the overall linear velocity of the gas stream, the oxygen linear velocity is fundamental to efficient activation of the chromium catalyst. The oxygen linear velocity is defined as the linear velocity of the gas stream (in ft/sec) times the oxygen content of the gas stream (in vol %). The oxygen linear velocity of the gas stream for the disclosed activation processes should be in a range from 0.05 to 0.15 ft/sec. Other suitable ranges for the oxygen linear velocity of the gas stream can include, but are not limited to, from 0.05 to 0.13 ft/sec, from 0.05 to 0.1 ft/sec, from 0.07 to 0.15 ft/sec, from 0.07 to 0.13 ft/sec, from 0.07 to 0.1 ft/sec, or from 0.1 to 0.15 ft/sec, and the like.

The ramp rate of the temperature (e.g., from ambient conditions) to the peak activation temperature of from 550° C. to 900° C. is not particularly limited. Generally, however, in the ramp up to the peak activation temperature, the rate of temperature increase falls in a range from 0.25° C./min to 5° C./min, such as from 0.5° C./min to 4° C./min, or from 0.5° C./min to 2.5° C./min.

While the composition of the gas stream can be the same during the ramp up to the peak activation temperature as it is during the hold time at the peak activation temperature, this is not a requirement. In fact, it can be beneficial to have a lower oxygen content at lower temperatures to minimize or prevent exotherms. Thus, the process can comprise, in a ramp up to the peak activation temperature, contacting the supported chromium catalyst with a gas stream comprising air or a mixture of air and an inert gas up to a temperature T1 in a range from 260° C. to 480° C. The oxygen content up to temperature T1 is ordinarily no more than 21 vol %, and often can be reduced further due to dilution with an inert gas, such as nitrogen, to the 10-20 vol % range.

After temperature T1 and up to the peak activation temperature, it is generally advantageous to use an oxygen-enriched gas stream (in a linear velocity range of 0.18-0.4 ft/sec). Accordingly, the process can further comprise, in the ramp up to the peak activation temperature, contacting the supported chromium catalyst with the gas stream comprising from 25 to 60 vol % oxygen from the temperature T1 to the peak activation temperature. The oxygen content between T1 and the peak activation temperature can be in any of the oxygen content ranges disclosed herein for use at the peak activation temperature. Further the oxygen content between T1 and the peak activation temperature can be the same oxygen content being used at the peak activation temperature, or the oxygen content can be different.

After exposure to the peak activation temperature for the prescribed hold time, the catalyst undergoes a cooling process. The atmosphere during this phase should be oxidizing, and can encompass both air and oxygen-enriched gas streams. Hence, the process for activating a chromium catalyst can further comprise, in a cool down from the peak activation temperature, contacting the activated chromium catalyst with a gas stream comprising from 20 to 60 vol % oxygen to a temperature T1 in a range from 260° C. to 480° C. Below temperature T1, in the cool down from the peak activation temperature, the activated chromium catalyst can be contacted with a gas stream consisting essentially of (or consisting of) an inert gas (such as nitrogen) from temperature T1 to ambient temperature conditions.

In various aspects contemplated herein, the processes for producing an activated chromium catalyst can further include an optional step after activation. As a non-limiting example, a reducing step can be performed after activation, and this reducing step can comprise contacting the activated chromium catalyst with a reducing gas stream comprising (or consisting essentially of, or consisting of) carbon monoxide (or other suitable material, such as a light hydrocarbon) under conditions sufficient to change an oxidation state of at least a portion of the chromium to divalent chromium. Generally, a change to divalent chromium (Cr(II)) results in a blue color.

Various temperature and time conditions can be employed in this optional reducing step. Illustrative reducing temperatures often fall within a range from 200° C. to 600° C., from 250° C. to 550° C., or from 300° C. to 500° C., and the like. Typical reducing time periods can range from 5 min to 15 hr, from 5 min to 8 hr, or from 10 min to 5 hr, and the like.

Any suitable reactor or vessel can be used to conduct the chromium activation processes, whether batch or continuous. In one aspect, the process is conducted in a batch fluidized bed vessel, while in another aspect, the process is conducted in a continuous fluidized bed vessel (one or more). When more than one vessel is used, the vessels can be configured in series, in parallel, or both. As would be recognized by those of skill in the art, other suitable techniques and equipment can be employed for the activation of the chromium catalysts, and such techniques and equipment are encompassed herein.

Chromium Catalysts

Generally, the disclosed processes are applicable to the activation of any supported chromium catalyst, and are not limited to the activation of any particular type of supported chromium catalyst comprising chromium to form the activated chromium catalyst with at least a portion of the chromium in a hexavalent oxidation state. Thus, supported chromium catalysts contemplated herein encompass those prepared by contacting a support with a chromium-containing compound—representative and non-limiting examples of the chromium-compound compound include chromium (III) acetate, basic chromium (III) acetate, chromium (III) acetylacetonate, $Cr_2(SO_4)_3$, $Cr(NO_3)_3$, and $CrO_3$.

Any suitable chromium-containing compound (or chromium precursor) can be used as a chromium component to prepare the supported chromium catalyst. Illustrative and non-limiting examples of chromium (II) compounds can include chromium (II) acetate, chromium (II) chloride, chromium (II) bromide, chromium (II) iodide, chromium (II) sulfate, and the like, as well as combinations thereof. Likewise, illustrative and non-limiting examples of chromium (III) compounds can include a chromium (III) carboxylate, a chromium (III) napthenate, a chromium (III) halide, chromium (III) sulfate, chromium (III) nitrate, a chromium (III) dionate, and the like, as well as combinations thereof. In some aspects, the chromium-containing compound can comprise chromium (III) acetate, chromium (III) acetylacetonate, chromium (III) chloride, chromium (III) bromide, chromium (III) sulfate, chromium (III) nitrate, and the like, as well as combinations thereof.

While not required, it can be beneficial for the chromium-containing compound to be soluble in a hydrocarbon solvent during preparation of the supported chromium catalyst. In such situations, the chromium-containing compound can comprise tertiary butyl chromate, a diarene chromium (0) compound, bis-cyclopentadienyl chromium (II), chromium (III) acetylacetonate, chromium acetate, and the like, or any combination thereof. Similarly, and not required, it can be beneficial for the chromium-containing compound to be soluble in water during preparation of the supported chromium catalyst. In such situations, the chromium-containing compound can comprise chromium trioxide, chromium acetate, chromium nitrate, and the like, or any combination thereof.

Various solid supports can be used for the supported chromium catalyst (and the activated chromium catalyst), such as conventional solid oxides. Generally, the solid oxide can comprise oxygen and one or more elements selected from Group 2, 3, 4, 5, 6, 7, 8, 9, 10, 11, 12, 13, 14, or 15 of the periodic table, or comprise oxygen and one or more elements selected from the lanthanide or actinide elements (See: Hawley's Condensed Chemical Dictionary, $11^{th}$ Ed., John Wiley & Sons, 1995; Cotton, F. A., Wilkinson, G., Murillo, C. A., and Bochmann, M., Advanced Inorganic Chemistry, $6^{th}$ Ed., Wiley-Interscience, 1999). For example, the solid oxide can comprise oxygen and an element, or elements, selected from Al, B, Be, Bi, Cd, Co, Cr, Cu, Fe, Ga, La, Mn, Mo, Ni, Sb, Si, Sn, Sr, Th, Tl, V, W, P, Y, Zn, and Zr. Illustrative examples of solid oxide materials or compounds that can be used as solid support can include, but are not limited to, $Al_2O_3$, $B_2O_3$, BeO, $Bi_2O_3$, CdO, $Co_3O_4$, $Cr_2O_3$, CuO, $Fe_2O_3$, $Ga_2O_3$, $La_2O_3$, $Mn_2O_3$, $MoO_3$, NiO, $P_2O_5$, $Sb_2O_5$, $SiO_2$, $SnO_2$, SrO, $ThO_2$, $TiO_2$, $V_2O_5$, $WO_3$, $Y_2O_3$, ZnO, $ZrO_2$, and the like, including mixed oxides thereof, and combinations thereof.

The solid oxide can encompass oxide materials such as silica, "mixed oxide" compounds thereof such as silica-titania, and combinations or mixtures of more than one solid oxide material. Mixed oxides such as silica-titania can be single or multiple chemical phases with more than one metal combined with oxygen to form the solid oxide. Examples of mixed oxides that can be used as solid oxide include, but are not limited to, silica-alumina, silica-coated alumina, silica-titania, silica-zirconia, alumina-titania, alumina-zirconia, zinc-aluminate, alumina-boria, silica-boria, aluminum phosphate, aluminophosphate, aluminophosphate-silica, titania-zirconia, and the like, or a combination thereof. In some aspects, the solid support can comprise silica, silica-alumina, silica-coated alumina, silica-titania, silica-titania-magnesia, silica-zirconia, silica-magnesia, silica-boria, aluminophosphate-silica, and the like, or any combination thereof. Silica-coated aluminas are encompassed herein; such oxide materials are described in, for example, U.S. Pat. Nos. 7,884,163 and 9,023,959, incorporated herein by reference in their entirety.

The percentage of each oxide in a mixed oxide can vary depending upon the respective oxide materials. As an example, a silica-alumina (or silica-coated alumina) typically has an alumina content from 5 wt. % to 95 wt. %. According to one aspect, the alumina content of the silica-alumina (or silica-coated alumina) can be from 5 wt. % alumina 50 wt. % alumina, or from 8 wt. % to 30 wt. % alumina. In another aspect, high alumina content silica-aluminas (or silica-coated aluminas) can be employed, in which the alumina content of these materials typically ranges from 60 wt. % alumina to 90 wt. % alumina, or from 65 wt. % alumina to 80 wt. % alumina.

In one aspect, the solid oxide can comprise silica-alumina, silica-coated alumina, silica-titania, silica-zirconia, alumina-titania, alumina-zirconia, zinc-aluminate, alumina-boria, silica-boria, aluminum phosphate, aluminophosphate, aluminophosphate-silica, titania-zirconia, or a combination thereof; alternatively, silica-alumina; alternatively, silica-coated alumina; alternatively, silica-titania; alternatively, silica-zirconia; alternatively, alumina-titania; alternatively, alumina-zirconia; alternatively, zinc-aluminate; alternatively, alumina-boria; alternatively, silica-boria; alternatively, aluminum phosphate; alternatively, aluminophosphate; alternatively, aluminophosphate-silica; or alternatively, titania-zirconia.

In another aspect, the solid oxide can comprise silica, alumina, titania, thoria, stania, zirconia, magnesia, boria, zinc oxide, a mixed oxide thereof, or any mixture thereof. In yet another aspect, the solid support can comprise silica, alumina, titania, or a combination thereof; alternatively, silica; alternatively, alumina; alternatively, titania; alternatively, zirconia; alternatively, magnesia; alternatively, boria; or alternatively, zinc oxide. In still another aspect, the solid oxide can comprise silica, alumina, silica-alumina, silica-coated alumina, aluminum phosphate, aluminophosphate, heteropolytungstate, titania, zirconia, magnesia, boria, zinc oxide, silica-titania, silica-yttria, silica-zirconia, alumina-titania, alumina-zirconia, zinc-aluminate, alumina-boria, silica-boria, aluminophosphate-silica, titania-zirconia, and the like, or any combination thereof.

Consistent with certain aspects of this invention, the supported chromium catalyst and the activated chromium catalyst can comprise a chemically-treated solid oxide as the support, and where the chemically-treated solid oxide comprises a solid oxide (any solid oxide disclosed herein) treated with an electron-withdrawing anion (any electron withdrawing anion disclosed herein). The electron-withdrawing component used to treat the solid oxide can be any component that increases the Lewis or Brønsted acidity of the solid oxide upon treatment (as compared to the solid oxide that is not treated with at least one electron-withdrawing anion). According to one aspect, the electron-withdrawing component can be an electron-withdrawing anion derived from a salt, an acid, or other compound, such as a volatile organic compound, that serves as a source or precursor for that anion. Examples of electron-withdrawing anions can include, but are not limited to, sulfate, bisulfate, fluoride, chloride, bromide, iodide, fluorosulfate, fluoroborate, phosphate, fluorophosphate, trifluoroacetate, triflate, fluorozirconate, fluorotitanate, phospho-tungstate, tungstate, molybdate, and the like, including mixtures and combinations thereof. In addition, other ionic or non-ionic compounds that serve as sources for these electron-withdrawing anions also can be employed.

It is contemplated that the electron-withdrawing anion can be, or can comprise, fluoride, chloride, bromide, phosphate, triflate, bisulfate, or sulfate, and the like, or any combination thereof, in some aspects provided herein. In other aspects, the electron-withdrawing anion can comprise sulfate, bisulfate, fluoride, chloride, bromide, iodide, fluorosulfate, fluoroborate, phosphate, fluorophosphate, trifluoroacetate, triflate, fluorozirconate, fluorotitanate, and the like, or combinations thereof. Yet, in other aspects, the electron-withdrawing anion can comprise fluoride and/or sulfate.

The chemically-treated solid oxide generally can contain from 1 wt. % to 30 wt. % of the electron-withdrawing anion, based on the weight of the chemically-treated solid oxide. In particular aspects provided herein, the chemically-treated solid oxide can contain from 1 to 20 wt. %, from 2 wt. % to 20 wt. %, from 3 wt. % to 20 wt. %, from 2 wt. % to 15 wt. %, from 3 wt. % to 15 wt. %, from 3 wt. % to 12 wt. %, or from 4 wt. % to 10 wt. %, of the electron-withdrawing anion, based on the total weight of the chemically-treated solid oxide.

In an aspect, the chemically-treated solid oxide can comprise fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, fluorided silica-titania, fluorided silica-coated alumina, fluorided-chlorided silica-coated alumina, sulfated silica-coated alumina, phosphated silica-coated alumina, and the like, as well as any mixture or combination thereof.

In another aspect, the chemically-treated solid oxide employed in the supported chromium catalyst and the activated chromium catalyst and the processes described herein can be, or can comprise, a fluorided solid oxide and/or a sulfated solid oxide, non-limiting examples of which can include fluorided alumina, sulfated alumina, fluorided silica-alumina, sulfated silica-alumina, fluorided silica-zirconia, fluorided silica-coated alumina, sulfated silica-coated alumina, and the like, as well as combinations thereof. Additional information on chemically-treated solid oxides can be found in, for instance, U.S. Pat. Nos. 7,294,599, 7,601,665, 7,884,163, 8,309,485, 8,623,973, and 8,703,886, which are incorporated herein by reference in their entirety.

Representative examples of supported chromium catalysts and activated chromium catalysts (in which a solid oxide is the support) include, but are not limited to, chromium/silica, chromium/silica-titania, chromium/silica-titania-magnesia, chromium/silica-alumina, chromium/silica-coated alumina, chromium/aluminophosphate, chromium/alumina, chromium/alumina borate, and the like, or any combination thereof. In one aspect, for instance, the supported chromium catalyst and the activated chromium catalyst can comprise chromium/silica, while in another aspect, the supported chromium catalyst and the activated chromium catalyst can comprise chromium/silica-titania, and in yet another aspect, the supported chromium catalyst and the activated chromium catalyst can comprise chromium/silica-alumina and/or chromium/silica-coated alumina. In circumstances in which the supported chromium catalyst and the activated chromium catalyst comprise chromium/silica-titania, any suitable amount of titanium can be present, including from 0.1 to 20 wt. %, from 0.5 to 15 wt. %, from 1 to 10 wt. %, or from 1 to 6 wt. % titanium, based on the total weight of the supported chromium catalyst and the activated chromium catalyst.

Representative examples of supported chromium catalysts and activated chromium catalysts (in which a chemically-treated solid oxide is the support) include, but are not limited to, chromium/sulfated alumina, chromium/fluorided alumina, chromium/fluorided silica-alumina, chromium/fluorided silica-coated alumina, and the like, as well as combinations thereof.

While not limited thereto, the amount of chromium in the supported chromium catalyst and the activated chromium catalyst typically can range from 0.1 to 15 wt. %; alternatively, from 0.2 to 10 wt. %; alternatively, from 0.1 to 5 wt. %; alternatively, from 0.5 to 3 wt. %; or alternatively, from 0.5 to 2 wt. %. These weight percentages are based on the amount of chromium relative to the total weight of the supported chromium catalyst or the activated chromium catalyst.

Likewise, the amount of chromium in an average oxidation state of +5 or less in the supported chromium catalyst (prior to activation) is not particularly limited. The amount of the chromium of the supported chromium catalyst in an oxidation state of +5 or less typically is at least 50 wt. %, and more often, at least 60 wt. %, at least 70 wt. %, at least 80 wt. %, at least 90 wt. %, or at least 95 wt. %. This percentage is based on the amount of the chromium of the supported chromium catalyst in an oxidation state of +5 or less relative to the total amount of chromium on the supported chromium catalyst.

Stated another way, the chromium in the supported chromium catalyst (prior to activation) can be characterized by an average valence of less than or equal to 5.25. More often, the chromium in the supported chromium catalyst has an average valence of less than or equal to 5; alternatively, an average valence of less than or equal to 4.5; alternatively, an average valence of less than or equal to 4; alternatively, an average valence of less than or equal to 3.75; or alternatively, an average valence of less than or equal to 3.5. Ordinarily, the supported chromium catalysts (prior to activation) will have a green, blue, gray, or black color, but this can vary.

Conversely, at least 40 wt. % of the chromium in the activated chromium catalyst is present in a hexavalent oxidation state after the activation step, and more often at least 50 wt. % is present as chromium (VI). In further aspects, at least 60 wt. %, at least 70 wt. %, at least 80 wt. %, at least 90 wt. %, or at least 95 wt. %, of the chromium in the activated chromium catalyst can be present in an oxidation state of +6. These weight percentages are based on the total amount of chromium present on the activated chromium catalyst. Traditional chromium (VI) catalysts often will have an orange, yellow, or tan color, indicating the presence of chromium (VI).

It is important to note that chromium polymerization catalysts require supports of relatively high porosity so as to allow fragmentation of the catalyst and subsequent egress of the polymer chains, which are hundreds of times longer than the pore diameter in the catalyst. Thus, the total pore volume of the supported chromium catalyst and the activated chromium catalyst can be in a range from 0.5 to 5 mL/g, from 1 to 5 mL/g, from 1 to 3 mL/g, or from 1.2 to 2.5 mL/g. The BET surface area of the supported chromium catalyst (or the activated chromium catalyst) is not limited to any particular range, but generally is in a range from 100 to 700 m$^2$/g, such as from 200 to 600 m$^2$/g, from 250 to 550 m$^2$/g, or from 275 to 525 m$^2$/g.

The supported chromium catalyst and the activated chromium catalyst can have any suitable shape or form, and such can depend on the type of polymerization process in which the chromium catalyst is utilized. Generally, however, the supported chromium catalyst and the activated chromium catalyst have a relatively small particle size, in which representative ranges for the average (d50) particle size of the supported chromium catalyst and the activated chromium catalyst can include from 10 to 500 microns, from 15 to 250 microns, from 15 to 150 microns, from 20 to 100 microns, or from 40 to 150 microns.

Polymerization Processes

Olefin polymers (e.g., ethylene polymers) can be produced from the activated chromium catalyst using any suitable olefin polymerization process using various types of polymerization reactors, polymerization reactor systems, and polymerization reaction conditions. One such olefin polymerization process can comprise (i) performing any process to produce the activated chromium catalyst disclosed herein, and (ii) contacting the activated chromium catalyst and an optional co-catalyst with an olefin monomer and an optional olefin comonomer in a polymerization reactor system under polymerization conditions to produce an olefin polymer. This invention also encompasses any olefin polymers (e.g., ethylene polymers) produced by any of the polymerization processes disclosed herein.

In the polymerization processes, a co-catalyst can be utilized with the activated chromium catalyst. In one aspect, the co-catalyst can comprise an aluminoxane compound, an organoaluminum compound, or an organoboron compound, and this includes combinations of more than co-catalyst compound. Representative and non-limiting examples of aluminoxanes include methylaluminoxane, modified methylaluminoxane, ethylaluminoxane, n-propylaluminoxane, iso-propylaluminoxane, n-butylaluminoxane, t-butylaluminoxane, sec-butylaluminoxane, iso-butylaluminoxane, 1-pentylaluminoxane, 2-pentylaluminoxane, 3-pentylaluminoxane, isopentylaluminoxane, neopentylaluminoxane, and the like, or any combination thereof. Representative and non-limiting examples of organoaluminums include trim ethyl aluminum, tri ethyl aluminum, tri-n-propyl aluminum, tri-n-butyl aluminum, triisobutylaluminum, tri-n-hexylaluminum, tri-n-octylaluminum, diisobutylaluminum hydride, di ethyl aluminum ethoxide, di ethyl aluminum chloride, and the like, or any combination thereof. Representative and non-limiting examples of organoborons include tri-n-butyl borane, tripropylborane, triethylborane, and the like, or any combination thereof. Co-catalysts that can be used are not limited to the co-catalysts described above. Other suitable co-catalysts (such as organomagnesiums and organolithiums) are well known to those of skill in the art including, for example, those disclosed in U.S. Pat. Nos. 3,242,099, 4,794, 096, 4,808,561, 5,576,259, 5,807,938, 5,919,983, 7,294,599 7,601,665, 7,884,163, 8,114,946, and 8,309,485, which are incorporated herein by reference in their entirety.

As used herein, a "polymerization reactor" includes any polymerization reactor capable of polymerizing (inclusive of oligomerizing) olefin monomers and comonomers (one or more than one comonomer) to produce homopolymers, copolymers, terpolymers, and the like. The various types of polymerization reactors include those that can be referred to as a batch reactor, slurry reactor, gas-phase reactor, solution reactor, high pressure reactor, tubular reactor, autoclave reactor, and the like, or combinations thereof; or alternatively, the polymerization reactor system can comprise a slurry reactor, a gas-phase reactor, a solution reactor, or a combination thereof. The polymerization conditions for the various reactor types are well known to those of skill in the art. Gas phase reactors can comprise fluidized bed reactors or staged horizontal reactors. Slurry reactors can comprise vertical or horizontal loops. High pressure reactors can comprise autoclave or tubular reactors. Reactor types can include batch or continuous processes. Continuous processes can use intermittent or continuous product discharge. Polymerization reactor systems and processes also can include partial or full direct recycle of unreacted monomer, unreacted comonomer, and/or diluent.

A polymerization reactor system can comprise a single reactor or multiple reactors (2 reactors, more than 2 reactors) of the same or different type. For instance, the polymerization reactor system can comprise a slurry reactor, a gas-phase reactor, a solution reactor, or a combination of two or more of these reactors. Production of polymers in multiple reactors can include several stages in at least two separate polymerization reactors interconnected by a transfer device making it possible to transfer the polymers resulting from the first polymerization reactor into the second reactor. The desired polymerization conditions in one of the reactors can be different from the operating conditions of the other reactor(s). Alternatively, polymerization in multiple reactors can include the manual transfer of polymer from one reactor to subsequent reactors for continued polymerization. Multiple reactor systems can include any combination including, but not limited to, multiple loop reactors, multiple gas phase reactors, a combination of loop and gas phase reactors, multiple high pressure reactors, or a combination of high pressure with loop and/or gas phase reactors. The multiple reactors can be operated in series, in parallel, or both. Accordingly, the present invention encompasses polymerization reactor systems comprising a single reactor, comprising two reactors, and comprising more than two reactors. The polymerization reactor system can comprise a slurry reactor, a gas-phase reactor, a solution reactor, in certain aspects of this invention, as well as multi-reactor combinations thereof.

According to one aspect, the polymerization reactor system can comprise at least one loop slurry reactor comprising vertical or horizontal loops. Monomer, diluent, catalyst, and comonomer can be continuously fed to a loop reactor where polymerization occurs. Generally, continuous processes can comprise the continuous introduction of monomer/comonomer, a catalyst, and a diluent into a polymerization reactor and the continuous removal from this reactor of a suspension comprising polymer particles and the diluent. Reactor effluent can be flashed to remove the solid polymer from the liquids that comprise the diluent, monomer and/or comonomer. Various technologies can be used for this separation step including, but not limited to, flashing that can include any combination of heat addition and pressure reduction, separation by cyclonic action in either a cyclone or hydrocyclone, or separation by centrifugation.

A typical slurry polymerization process (also known as the particle form process) is disclosed, for example, in U.S. Pat. Nos. 3,248,179, 4,501,885, 5,565,175, 5,575,979, 6,239,235, 6,262,191, 6,833,415, and 8,822,608, each of which is incorporated herein by reference in its entirety.

Suitable diluents used in slurry polymerization include, but are not limited to, the monomer being polymerized and hydrocarbons that are liquids under reaction conditions. Examples of suitable diluents include, but are not limited to, hydrocarbons such as propane, cyclohexane, isobutane, n-butane, n-pentane, isopentane, neopentane, and n-hexane. Some loop polymerization reactions can occur under bulk conditions where no diluent is used.

According to yet another aspect, the polymerization reactor system can comprise at least one gas phase reactor (e.g., a fluidized bed reactor). Such reactor systems can employ a continuous recycle stream containing one or more monomers continuously cycled through a fluidized bed in the presence of the catalyst under polymerization conditions. A recycle stream can be withdrawn from the fluidized bed and recycled back into the reactor. Simultaneously, polymer product can be withdrawn from the reactor and new or fresh monomer can be added to replace the polymerized monomer. Such gas phase reactors can comprise a process for multi-step gas-phase polymerization of olefins, in which olefins are polymerized in the gaseous phase in at least two independent gas-phase polymerization zones while feeding a catalyst-containing polymer formed in a first polymerization zone to a second polymerization zone. Representative gas phase reactors are disclosed in U.S. Pat. Nos. 5,352,749, 4,588,790, 5,436,304, 7,531,606, and 7,598,327, each of which is incorporated by reference in its entirety herein.

According to still another aspect, the polymerization reactor system can comprise a high pressure polymerization reactor, e.g., can comprise a tubular reactor or an autoclave reactor. Tubular reactors can have several zones where fresh monomer, initiators, or catalysts are added. Monomer can be entrained in an inert gaseous stream and introduced at one zone of the reactor. Initiators, catalysts, and/or catalyst components can be entrained in a gaseous stream and introduced at another zone of the reactor. The gas streams can be intermixed for polymerization. Heat and pressure can be employed appropriately to obtain optimal polymerization reaction conditions.

According to yet another aspect, the polymerization reactor system can comprise a solution polymerization reactor wherein the monomer/comonomer are contacted with the catalyst by suitable stirring or other means. A carrier comprising an inert organic diluent or excess monomer can be employed. If desired, the monomer/comonomer can be brought in the vapor phase into contact with the catalytic reaction product, in the presence or absence of liquid material. The polymerization zone can be maintained at temperatures and pressures that will result in the formation of a solution of the polymer in a reaction medium. Agitation can be employed to obtain better temperature control and to maintain uniform polymerization mixtures throughout the polymerization zone. Adequate means are utilized for dissipating the exothermic heat of polymerization.

The polymerization reactor system can further comprise any combination of at least one raw material feed system, at least one feed system for catalyst or catalyst components, and/or at least one polymer recovery system. Suitable reactor systems can further comprise systems for feedstock purification, catalyst storage and preparation, extrusion, reactor cooling, polymer recovery, fractionation, recycle, storage, loadout, laboratory analysis, and process control. Depending upon the desired properties of the olefin polymer, hydrogen can be added to the polymerization reactor as needed (e.g., continuously or pulsed).

Polymerization conditions that can be controlled for efficiency and to provide desired polymer properties can include temperature, pressure, and the concentrations of various reactants. Polymerization temperature can affect catalyst productivity, polymer molecular weight, and molecular weight distribution. Various polymerization conditions can be held substantially constant, for example, for the production of a particular grade of the olefin polymer (or ethylene polymer). A suitable polymerization temperature can be any temperature below the de-polymerization temperature according to the Gibbs Free energy equation. Typically, this includes from 60° C. to 280° C., for example, or from 60° C. to 120° C., depending upon the type of polymerization reactor(s). In some reactor systems, the polymerization temperature generally can be within a range from 70° C. to 105° C., or from 75° C. to 100° C.

Suitable pressures will also vary according to the reactor and polymerization type. The pressure for liquid phase polymerizations in a loop reactor is typically less than 1000 psig (6.9 MPa). Pressure for gas phase polymerization is usually at 200 to 500 psig (1.4 MPa to 3.4 MPa). High pressure polymerization in tubular or autoclave reactors is generally run at 20,000 psig to 75,000 psig (138 MPa to 517 MPa). Polymerization reactors can also be operated in a supercritical region occurring at generally higher temperatures and pressures. Operation above the critical point of a pressure/temperature diagram (supercritical phase) can offer advantages to the polymerization reaction process.

Olefin monomers that can be employed with the chromium catalysts and polymerization processes of this invention typically can include olefin compounds having from 2 to 30 carbon atoms per molecule and having at least one olefinic double bond, such as ethylene or propylene. In an aspect, the olefin monomer can comprise a $C_2$-$C_{20}$ olefin; alternatively, a $C_2$-$C_{20}$ alpha-olefin; alternatively, a $C_2$-$C_{10}$ olefin; alternatively, a $C_2$-$C_{10}$ alpha-olefin; alternatively, the olefin monomer can comprise ethylene; or alternatively, the olefin monomer can comprise propylene (e.g., to produce a polypropylene homopolymer or a propylene-based copolymer).

When a copolymer (or alternatively, a terpolymer) is desired, the olefin monomer and the olefin comonomer independently can comprise, for example, a $C_2$-$C_{20}$ alpha-olefin. In some aspects, the olefin monomer can comprise ethylene or propylene, which is copolymerized with at least one comonomer (e.g., a $C_2$-$C_{20}$ alpha-olefin or a $C_3$-$C_{20}$ alpha-olefin). According to one aspect of this invention, the olefin monomer used in the polymerization process can comprise ethylene. In this aspect, the comonomer can comprise a $C_3$-$C_{10}$ alpha-olefin; alternatively, the comonomer can comprise 1-butene, 1-pentene, 1-hexene, 1-octene, 1-decene, styrene, or any combination thereof; alternatively, the comonomer can comprise 1-butene, 1-hexene, 1-octene, or any combination thereof; alternatively, the comonomer can comprise 1-butene; alternatively, the comonomer can comprise 1-hexene; or alternatively, the comonomer can comprise 1-octene.

Any suitable olefin polymer can be produced using the activated chromium catalysts disclosed herein. Generally, however, the olefin polymers are ethylene-based polymers, or ethylene polymers, encompassing homopolymers of ethylene as well as copolymers, terpolymers, etc., of ethylene and at least one olefin comonomer (as described herein). In one aspect, the ethylene polymer can comprise an ethylene/α-olefin copolymer, while in another aspect, the ethylene polymer can comprise an ethylene homopolymer, and in yet another aspect, the ethylene polymer can comprise an ethylene/α-olefin copolymer and an ethylene homopolymer. For example, the ethylene polymer can comprise an ethylene/1-butene copolymer, an ethylene/1-hexene copolymer, an ethylene/1-octene copolymer, an ethylene homopolymer, or any combination thereof; alternatively, an ethylene/1-butene copolymer, an ethylene/1-hexene copolymer, an ethylene/1-octene copolymer, or any combination thereof; or alternatively, an ethylene/1-hexene copolymer.

The densities of ethylene-based polymers that can be produced from the polymerization process often are greater than or equal to 0.92 g/cm$^3$, and less than or equal to 0.97 g/cm$^3$. Yet, in particular aspects, the density can be in a range from 0.93 to 0.96, from 0.93 to 0.956, from 0.934 to 0.96, from 0.934 to 0.956, from 0.934 to 0.95, or from 0.945 to 0.958 g/cm$^3$. While not being limited thereto, the ethylene polymer can have a high load melt index (HLMI) in a range from 0 to 100 g/10 min; alternatively, from 1 to 70 g/10 min; alternatively, from 0 to 50 g/10 min; alternatively, from 6 to 36 g/10 min; alternatively, from 6 to 15 g/10 min; alternatively, from 20 to 40 g/10 min; or alternatively, from 25 to 36 g/10 min.

Articles of manufacture can be formed from, and/or can comprise, the olefin polymers (e.g., ethylene polymers) of this invention and, accordingly, are encompassed herein. For example, articles which can comprise the polymers of this invention can include, but are not limited to, an agricultural film, an automobile part, a bottle, a container for chemicals, a drum, a fiber or fabric, a food packaging film or container, a food service article, a fuel tank, a geomembrane, a household container, a liner, a molded product, a medical device or material, an outdoor storage product (e.g., panels for walls of an outdoor shed), outdoor play equipment (e.g., kayaks, bases for basketball goals), a pipe, a sheet or tape, a toy, or a traffic barrier, and the like. Various processes can be employed to form these articles. Non-limiting examples of these processes include injection molding, blow molding, rotational molding, film extrusion, sheet extrusion, profile extrusion, thermoforming, and the like. Additionally, additives and modifiers often are added to these polymers in order to provide beneficial polymer processing or end-use product attributes. Such processes and materials are described in *Modern Plastics Encyclopedia*, Mid-November 1995 Issue, Vol. 72, No. 12; and *Film Extrusion Manual—Process, Materials, Properties*, TAPPI Press, 1992; the disclosures of which are incorporated herein by reference in their entirety.

EXAMPLES

The invention is further illustrated by the following examples, which are not to be construed in any way as imposing limitations to the scope of this invention. Various other aspects, modifications, and equivalents thereof, which after reading the description herein, can suggest themselves to one of ordinary skill in the art without departing from the spirit of the present invention or the scope of the appended claims.

Hexavalent chromium analysis was performed by adding approximately 1 gram of catalyst into dilute sulfuric acid solution, then titrating with calibrated solutions of ferrous ammonium sulfate, to the ferroin endpoint. Average valence can be determined using the procedure described in U.S. Patent Publication No. 2020/0087430, incorporated herein by reference in its entirety.

Catalyst A was a Cr/silica catalyst containing 1 wt. % Cr, with a BET surface area of 285 m$^2$/g, a pore volume of 1.6 mL/g, and an average particle size of 100 μm. Using a 42" diameter activation vessel (600-750 lb catalyst A charge) or a 48" diameter activation vessel (1050 lb catalyst A charge) and a ~6-7 ft bed, the linear velocity of the fluidizing air stream was varied from 0.21 to 0.75 ft/sec to determine the impact on the amount of Cr(VI). The peak activation temperatures were 815-858° C., the hold times were 2-12 hr, and the ramp rates were 1.3-2° C./min. FIG. 1 demonstrates the impact of the linear velocity of the fluidizing gas stream (air, 21 vol % oxygen) in large scale activation of supported chromium catalysts. Importantly, higher air velocity dramatically increased the amount of Cr(VI) conversion, up to an air velocity of approximately 0.5 ft/sec, above which further increases in air velocity did not provide a significant benefit. While not wishing to be bound by theory, it is believed that higher gas stream rates of about 0.5 ft/sec result in greater dilution of water/moisture in the activation atmosphere and more efficient removal of water/moisture from catalyst/chromium surface, thus maintaining of higher levels of Cr(VI) in the activation process.

Figure 2:
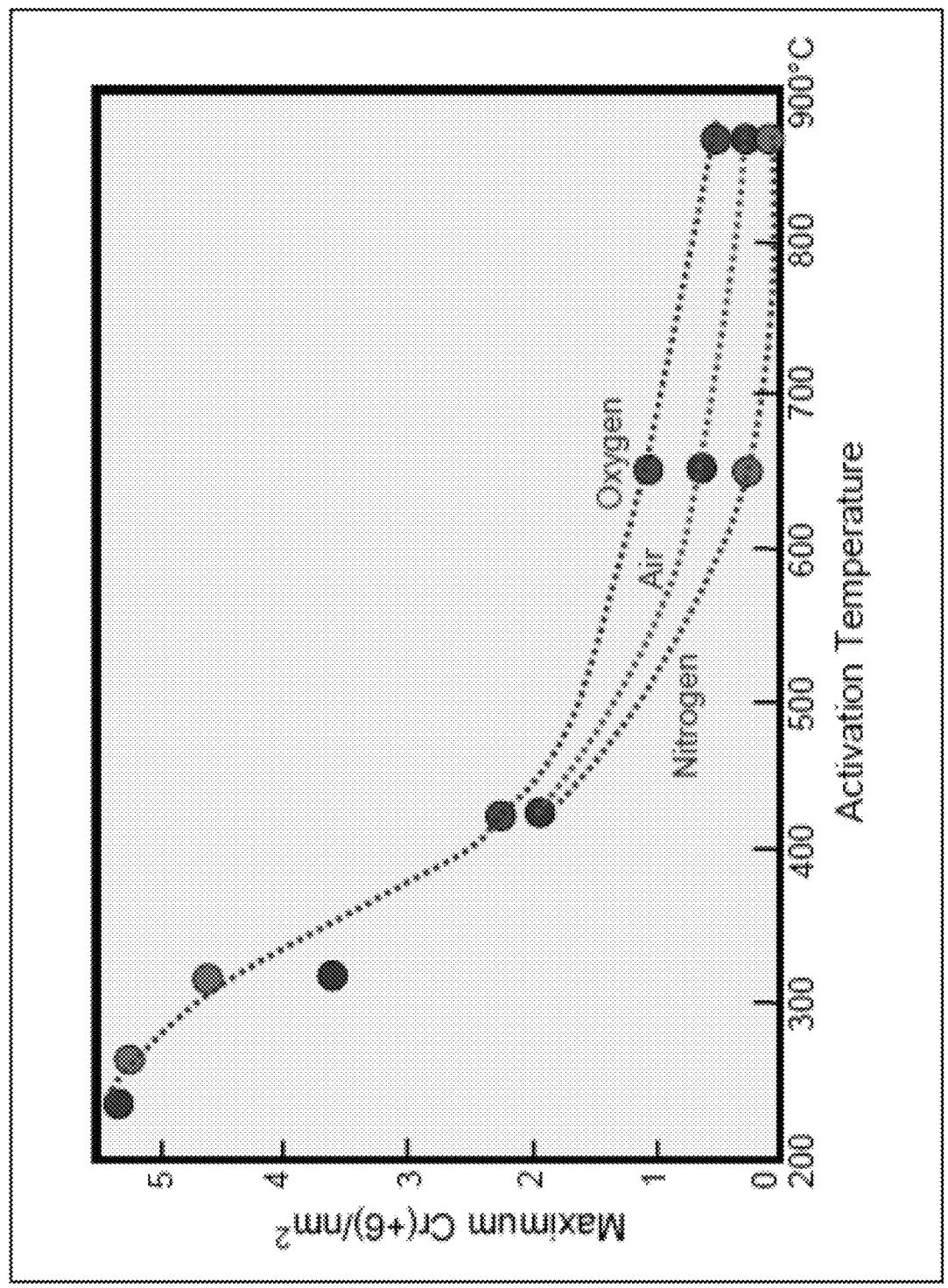
FIG. 2 presents a plot of maximum Cr(VI) content versus activation temperature and oxygen content during activation.

FIG. 2 demonstrates the impact of the activation atmosphere (oxygen, air, or nitrogen) on chromium/silica catalysts at different activation temperatures. A CrO$_3$/silica was activated at various temperatures in three different dry atmospheres: oxygen, air, and nitrogen. Each catalyst contained a large excess of CrO$_3$ so that the measured Cr(VI) after activation indicates the maximum amount of hexavalent chromium that could be surface stabilized under the conditions used. Unexpectedly, above 400° C. the three curves separate; the amount of Cr(VI) stabilized was dependent upon the amount of oxygen in the atmosphere. Increased oxygen content increased stabilization of Cr(VI). Thus, oxygen-rich atmospheres (higher oxygen contents in the fluidizing gas stream) can lead to higher Cr(VI) contents than air and, therefore, the oxygen linear velocity of the gas stream is an important factor for efficient chromium activation.

Figure 3:
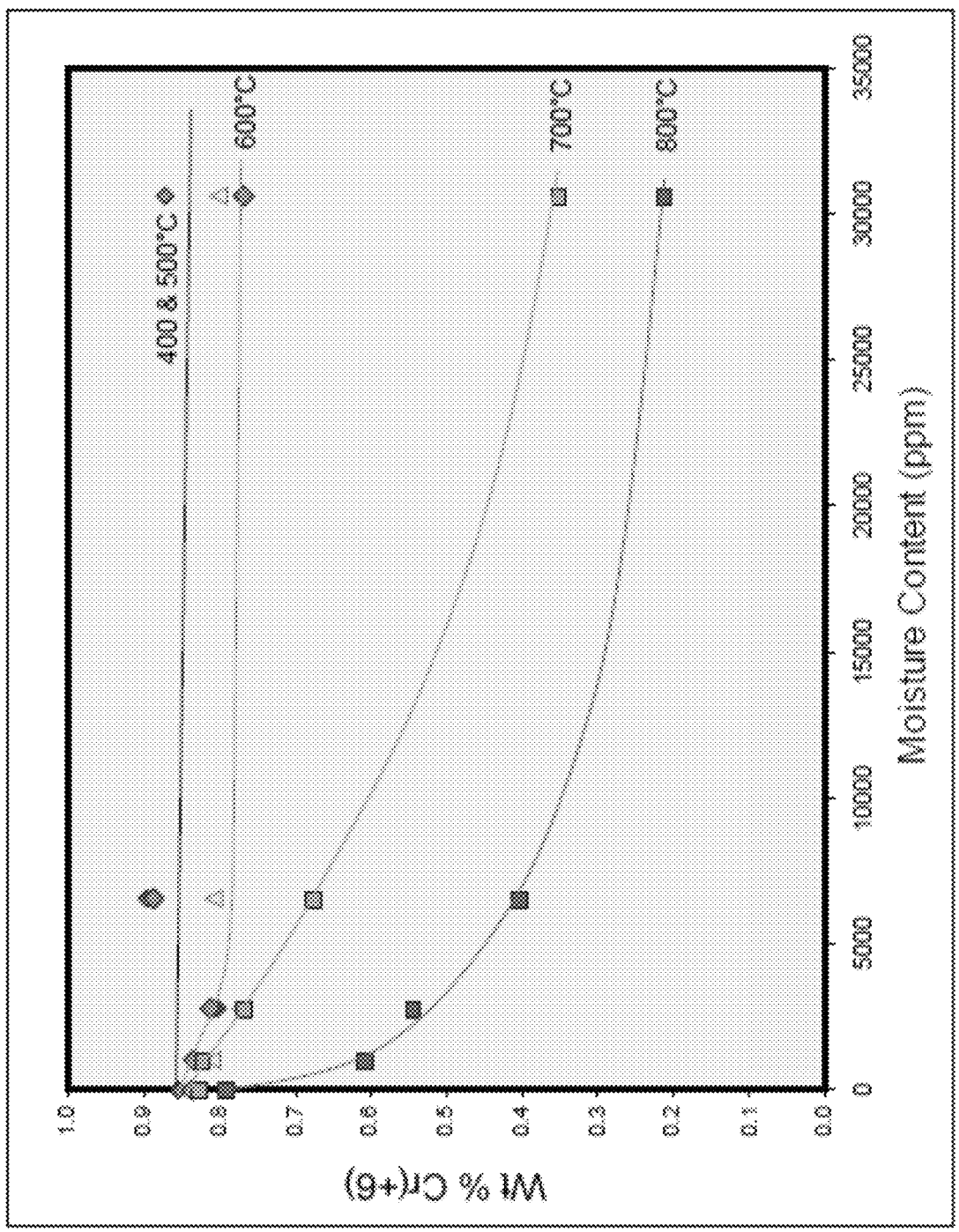
FIG. 3 presents a plot of Cr(VI) content versus moisture content (ppm) and activation temperature.

FIG. 3 illustrates the sensitivity of Cr(VI) to moisture as a function of temperature. Catalyst B (Cr/silica catalyst, 2 wt. % $CrO_3$ on silica) was activated at peak temperatures ranging from 400° C. to 800° C., and within each series, the dry air stream was adjusted to contain various amounts of moisture. This was done by passing the air though water, or ice, or by mixing saturated air with dry air. The Cr(VI) concentration on each catalyst was then determined. Surprisingly, at 600° C. and below, even 30,000 ppm moisture (100% humidity at room temperature) did little harm to the catalyst. Above 600° C., and encompassing most of the peak activation temperatures disclosed herein, however, Cr(VI) became increasingly unstable in the presence of moisture. Hence, the impact of the fluidizing gas stream velocity (or the oxygen linear velocity) and the oxygen content on diluting and removing water/moisture from the catalyst becomes more important at higher activation temperatures.

The invention is described above with reference to numerous aspects and specific examples. Many variations will suggest themselves to those skilled in the art in light of the above detailed description. All such obvious variations are within the full intended scope of the appended claims. Other aspects of the invention can include, but are not limited to, the following (aspects are described as "comprising" but, alternatively, can "consist essentially of" or "consist of"):

Aspect 1. A process to produce an activated (calcined) chromium catalyst, the process comprising:

contacting a supported chromium catalyst with a gas stream comprising from 25 to 60 vol % oxygen at a peak activation temperature of from 550° C. to 900° C. to produce the activated chromium catalyst; wherein:

a linear velocity of the gas stream is in a range from 0.18 to 0.4 ft/sec; and an oxygen linear velocity of the gas stream is in a range from 0.05 to 0.15 ft/sec.

Aspect 2. The process defined in aspect 1, wherein the supported chromium catalyst and the activated chromium catalyst comprise any suitable solid oxide or any solid oxide disclosed herein, e.g., silica, alumina, silica-alumina, silica-coated alumina, aluminum phosphate, aluminophosphate, heteropolytungstate, titania, zirconia, magnesia, boria, zinc oxide, silica-titania, silica-zirconia, alumina-titania, alumina-zirconia, zinc-aluminate, alumina-boria, alumina borate, silica-boria, aluminophosphate-silica, titania-zirconia, or any combination thereof.

Aspect 3. The process defined in aspect 1, wherein the supported chromium catalyst and the activated chromium catalyst comprise silica, silica-alumina, silica-coated alumina, silica-titania, silica-titania-magnesia, silica-zirconia, silica-magnesia, silica-boria, aluminophosphate-silica, alumina, alumina borate, or any combination thereof.

Aspect 4. The process defined in aspect 1, wherein the supported chromium catalyst and the activated chromium catalyst comprise a chemically-treated solid oxide comprising a solid oxide (e.g., as in aspect 2 or 3, such as silica, alumina, silica-alumina, silica-titania, silica-zirconia, silica-yttria, aluminophosphate, zirconia, titania, thoria, or stania) treated with an electron-withdrawing anion.

Aspect 5. The process defined in aspect 4, wherein the electron-withdrawing anion comprises sulfate, bisulfate, fluoride, chloride, bromide, iodide, fluorosulfate, fluoroborate, phosphate, fluorophosphate, trifluoroacetate, triflate, fluorozirconate, fluorotitanate, phospho-tungstate, tungstate, molybdate, or any combination thereof.

Aspect 6. The process defined in aspect 4 or 5, wherein the chemically-treated solid oxide contains from 1 to 30 wt. %, from 2 to 20 wt. %, from 2 to 15 wt. %, from 3 to 12 wt. %, or from 4 to 10 wt. %, of the electron-withdrawing anion, based on the total weight of the chemically-treated solid oxide.

Aspect 7. The process defined in aspect 1, wherein the supported chromium catalyst and the activated chromium catalyst comprise a chemically-treated solid oxide comprising fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, fluorided silica-titania, fluorided silica-coated alumina, fluorided-chlorided silica-coated alumina, sulfated silica-coated alumina, phosphated silica-coated alumina, or any combination thereof.

Aspect 8. The process defined in aspect 1, wherein the supported chromium catalyst and the activated chromium catalyst comprise chromium/silica, chromium/silica-titania, chromium/silica-titania-magnesia, chromium/silica-alumina, chromium/silica-coated alumina, chromium/aluminophosphate, chromium/alumina, chromium/alumina borate, or any combination thereof.

Aspect 9. The process defined in aspect 1, wherein the supported chromium catalyst and the activated chromium catalyst comprise chromium/silica-titania, and the supported chromium catalyst and the activated chromium catalysts comprise any suitable amount of titanium or an amount in any range disclosed herein, e.g., from 0.1 to 20 wt. %, from 0.5 to 15 wt. %, from 1 to 10 wt. %, or from 1 to 6 wt. %, based on the weight of the supported chromium catalyst or the activated chromium catalyst.

Aspect 10. The process defined in aspect 1, wherein the supported chromium catalyst and the activated chromium catalyst comprise chromium/sulfated alumina, chromium/fluorided alumina, chromium/fluorided silica-alumina, chromium/fluorided silica-coated alumina, or any combination thereof.

Aspect 11. The process defined in any one of the preceding aspects, wherein the supported chromium catalyst and the activated chromium catalyst comprise any suitable amount of chromium or an amount in any range disclosed herein, e.g., from 0.1 to 15 wt. %, from 0.2 to 10 wt. %, from 0.1 to 5 wt. %, from 0.5 to 3 wt. %, or from 0.5 to 2 wt. % of chromium, based on the weight of the supported chromium catalyst or the activated chromium catalyst.

Aspect 12. The process defined in any one of the preceding aspects, wherein the amount of chromium of the activated chromium catalyst in a hexavalent oxidation state is at least 40 wt. %, at least 50 wt. %, at least 60 wt. %, at least 70 wt. %, at least 80 wt. %, at least 90 wt. %, or at least 95 wt. %, based on the total amount of chromium on the activated chromium catalyst.

Aspect 13. The process defined in any one of the preceding aspects, wherein the amount of chromium of the supported chromium catalyst in an oxidation state of +5 or less is at least 50 wt. %, at least 60 wt. %, at least 70 wt. %, at least 80 wt. %, at least 90 wt. %, or at least 95 wt. %, based on the total amount of chromium on the supported chromium catalyst.

Aspect 14. The process defined in any one of the preceding aspects, wherein the chromium in the supported chromium catalyst has an average valence of less than or equal to 5, less than or equal to 4.5, less than or equal to 4, or less than or equal to 3.5.

Aspect 15. The process defined in any one of the preceding aspects, wherein the supported chromium catalyst and the activated chromium catalyst have any suitable pore volume (total) or a pore volume (total) in any range disclosed herein, e.g., from 0.5 to 5 mL/g, from 1 to 5 mL/g, from 1 to 3 mL/g, or from 1.2 to 2.5 mL/g.

Aspect 16. The process defined in any one of the preceding aspects, wherein the supported chromium catalyst and the activated chromium catalyst have any suitable BET surface area or a BET surface area in any range disclosed herein, e.g., from 100 to 700 $m^2/g$, from 200 to 600 $m^2/g$, from 250 to 550 $m^2/g$, or from 275 to 525 $m^2/g$.

Aspect 17. The process defined in any one of the preceding aspects, wherein the supported chromium catalyst and the activated chromium catalyst have any suitable average (d50) particle size or an average (d50) particle size in any range disclosed herein, e.g., from 10 to 500 microns, from 15 to 150 microns, or from 20 to 100 microns.

Aspect 18. The process defined in any one of the preceding aspects, wherein the peak activation temperature is in any suitable range or any range disclosed herein, e.g., from 550° C. to 800° C., from 600° C. to 900° C., from 600° C. to 871° C., from 600° C. to 800° C., from 650° C. to 900° C., from 650° C. to 800° C., from 700° C. to 900° C., from 700° C. to 850° C., or from 750° C. to 871° C.

Aspect 19. The process defined in any one of the preceding aspects, wherein the hold time (or soak time) at the peak activation temperature is any suitable duration of time or any time period disclosed herein, e.g., from 1 to 30 hr, from 3 to 20 hr, from 4 to 20 hr, or from 5 to 15 hr.

Aspect 20. The process defined in any one of the preceding aspects, wherein the gas stream comprises any suitable amount of oxygen or any amount of oxygen disclosed herein, e.g., from 25 to 55 vol %, from 25 to 50 vol %, from 25 to 45 vol %, from 30 to 60 vol %, from 30 to 50 vol %, from 30 to 40 vol %, or from 35 to 55 vol % oxygen.

Aspect 21. The process defined in any one of the preceding aspects, wherein the linear velocity of the gas stream is in any suitable range or any range disclosed herein, e.g., from 0.18 to 0.35 ft/sec, from 0.18 to 0.3 ft/sec. from 0.2 to 0.33 ft/sec, from 0.2 to 0.3 ft/sec, from 0.2 to 0.27 ft/sec, from 0.22 to 0.4 ft/sec, from 0.22 to 0.35 ft/sec, from 0.22 to 0.32 ft/sec, from 0.22 to 0.3 ft/sec, from 0.25 to 0.38 ft/sec, from 0.25 to 0.35 ft/sec, or from 0.25 to 0.32 ft/sec.

Aspect 22. The process defined in any one of the preceding aspects, wherein the oxygen linear velocity of the gas stream is in any suitable range or any range disclosed herein, e.g., from 0.05 to 0.13 ft/sec, from 0.05 to 0.1 ft/sec, from 0.07 to 0.15 ft/sec, from 0.07 to 0.13 ft/sec, from 0.07 to 0.1 ft/sec, or from 0.1 to 0.15 ft/sec.

Aspect 23. The process defined in any one of the preceding aspects, wherein, in a ramp up to the peak activation temperature, the rate of temperature increase is in any suitable range or any range disclose herein, e.g., from 0.25° C./min to 5° C./min, from 0.5° C./min to 4° C./min, or from 0.5° C./min to 2.5° C./min.

Aspect 24. The process defined in any one of the preceding aspects, wherein the process further comprises, in a ramp up to the peak activation temperature, contacting the supported chromium catalyst with a gas stream comprising air or a mixture of air and an inert gas up to a temperature T1 in a range from 260° C. to 480° C.

Aspect 25. The process defined in aspect 23 or 24, wherein the process further comprises, in the ramp up to the peak activation temperature, contacting the supported chromium catalyst with the gas stream comprising from 25 to 60 vol % oxygen from the temperature T1 to the peak activation temperature.

Aspect 26. The process defined in any one of the preceding aspects, wherein the process further comprises, in a cool down from the peak activation temperature, contacting the activated chromium catalyst with a gas stream comprising from 20 to 60 vol % oxygen to a temperature T1 in a range from 260° C. to 480° C.

Aspect 27. The process defined in any one of the preceding aspects, wherein the process further comprises, in the cool down from the peak activation temperature, contacting the activated chromium catalyst with a gas stream consisting essentially of (or consisting of) an inert gas (e.g. nitrogen) from temperature T1 to ambient temperature conditions.

Aspect 28. The process defined in any one of the preceding aspects, further comprising a step of contacting the activated chromium catalyst with carbon monoxide (or other suitable material, such as a light hydrocarbon) under conditions sufficient to change an oxidation state of at least a portion of the chromium to divalent chromium.

Aspect 29. The process defined in aspect 28, wherein the conditions comprise a reducing temperature in any suitable range or any range disclosed herein, e.g., from 200° C. to 600° C., from 250° C. to 550° C., or from 300° C. to 500° C.

Aspect 30. The process defined in aspect 28 or 29, wherein the conditions comprise a reducing time in any suitable range or a reducing time in any range disclosed herein, e.g., from 5 min to 15 hr, from 5 min to 8 hr, or from 10 min to 5 hr.

Aspect 31. The process defined in any one of the preceding aspects, wherein the process is conducted in a batch fluidized bed vessel or a continuous fluidized bed vessel.

Aspect 32. An olefin polymerization process, the olefin polymerization process comprising (i) performing the process to produce the activated chromium catalyst defined in any one of aspects 1-31, and (ii) contacting the activated chromium catalyst and an optional co-catalyst with an olefin monomer and an optional olefin comonomer in a polymerization reactor system under polymerization conditions to produce an olefin polymer.

Aspect 33. The olefin polymerization process defined in aspect 32, wherein a co-catalyst is used, and the co-catalyst comprises any suitable co-catalyst or any co-catalyst disclosed herein, e.g., an aluminoxane co-catalyst, an organoaluminum co-catalyst, an organoboron co-catalyst, or any combination thereof.

Aspect 34. The olefin polymerization process defined in aspect 32 or 33, wherein the olefin monomer and the optional olefin comonomer independently comprise a $C_2$-$C_{20}$ alpha-olefin.

Aspect 35. The olefin polymerization process defined in any one of aspects 32-34, wherein the olefin monomer comprises ethylene.

Aspect 36. The olefin polymerization process defined in any one of aspects 32-35, wherein the activated chromium catalyst is contacted with ethylene and an olefin comonomer comprising a $C_3$-$C_{10}$ alpha-olefin.

Aspect 37. The olefin polymerization process defined in any one of aspects 32-36, wherein the activated chromium catalyst is contacted with ethylene and an olefin comonomer comprising 1-butene, 1-hexene, 1-octene, or a mixture thereof.

Aspect 38. The olefin polymerization process defined in any one of aspects 32-37, wherein the polymerization reactor system comprises a slurry reactor, a gas-phase reactor, a solution reactor, or a combination thereof.

Aspect 39. The olefin polymerization process defined in any one of aspects 32-38, wherein the polymerization reactor system comprises a loop slurry reactor.

Aspect 40. The olefin polymerization process defined in any one of aspects 32-39, wherein the polymerization reactor system comprises a single reactor.

Aspect 41. The olefin polymerization process defined in any one of aspects 32-39, wherein the polymerization reactor system comprises 2 reactors.

Aspect 42. The olefin polymerization process defined in any one of aspects 32-39, wherein the polymerization reactor system comprises more than 2 reactors.

Aspect 43. The olefin polymerization process defined in any one of aspects 32-42, wherein the olefin polymer comprises any olefin polymer disclosed herein.

Aspect 44. The olefin polymerization process defined in any one of aspects 32-43, wherein the olefin polymer comprises an ethylene homopolymer, an ethylene/1-butene copolymer, an ethylene/1-hexene copolymer, and/or an ethylene/1-octene copolymer.

Aspect 45. The olefin polymerization process defined in any one of aspects 32-44, wherein the polymerization conditions comprise a polymerization reaction temperature in a range from 60° C. to 120° C. and a reaction pressure in a range from 200 to 1000 psig (1.4 to 6.9 MPa).

Aspect 46. The olefin polymerization process defined in any one of aspects 32-45 wherein the polymerization conditions are substantially constant, e.g., for a particular polymer grade.

Aspect 47. The olefin polymerization process defined in any one of aspects 32-46, wherein no hydrogen is added to the polymerization reactor system.

Aspect 48. The olefin polymerization process defined in any one of aspects 32-46, wherein hydrogen is added to the polymerization reactor system.

Aspect 49. The olefin polymerization process defined in any one of aspects 32-48, wherein the olefin polymer is an ethylene polymer characterized by a density in any range disclosed herein, e.g., from 0.93 to 0.96, from 0.93 to 0.956, from 0.934 to 0.96, from 0.934 to 0.956, from 0.934 to 0.95, or from 0.945 to 0.958 g/cm$^3$.

Aspect 50. The olefin polymerization process defined in any one of aspects 32-49, wherein the olefin polymer is an ethylene polymer characterized by a high load melt index (HLMI) in any range disclosed herein, e.g., from 1 to 70, from 0 to 50, from 6 to 36, from 6 to 15, from 20 to 40, or from 25 to 36 g/10 min.

Aspect 51. An olefin polymer produced by the olefin polymerization process defined in any one of aspects 32-50.

Aspect 52. An article of manufacture comprising the polymer defined in aspect 51.

We claim:

1. A process to produce an activated chromium catalyst, the process comprising:
   contacting a supported chromium catalyst with a gas stream comprising from 25 to 60 vol % oxygen at a peak activation temperature of from 550° C. to 900° C. to produce the activated chromium catalyst; wherein:
   a linear velocity of the gas stream is in a range from 0.18 to 0.4 ft/sec; and
   an oxygen linear velocity of the gas stream is in a range from 0.05 to 0.15 ft/sec.

2. The process of claim 1, wherein the supported chromium catalyst contains from 0.1 to 15 wt % of chromium, based on a weight of the supported chromium catalyst, and the chromium has an average valence of less than or equal to 3.5.

3. The process of claim 1, wherein:
   an amount of chromium of the supported chromium catalyst in an oxidation state of +5 or less is at least 60 wt %; and
   an amount of chromium of the activated chromium catalyst in a hexavalent oxidation state is at least 50 wt %.

4. The process of claim 1, wherein:
   an amount of chromium of the supported chromium catalyst in an oxidation state of +5 or less is at least 80 wt %; and
   an amount of chromium of the activated chromium catalyst in a hexavalent oxidation state is at least 60 wt %.

5. The process of claim 1, wherein the supported chromium catalyst and the activated chromium catalyst comprise silica.

6. The process of claim 1, wherein the supported chromium catalyst and the activated chromium catalyst comprise chromium/silica, chromium/silica-titania, chromium/silica-titania-magnesia, chromium/silica-alumina, chromium/silica-coated alumina, chromium/aluminophosphate, chromium/alumina, chromium/alumina borate, or any combination thereof.

7. The process of claim 1, wherein the peak activation temperature is in a range from 600° C. to 871° C.

8. The process of claim 1, wherein the gas stream comprises from 25 to 50 vol % oxygen.

9. The process of claim 1, wherein the linear velocity of the gas stream is in a range from 0.18 to 0.33 ft/sec.

10. The process of claim 1, wherein the oxygen linear velocity of the gas stream is in a range from 0.07 to 0.13 ft/sec.

11. The process of claim 1, wherein, in a ramp up to the peak activation temperature, a rate of temperature increase is in a range from 0.25° C./min to 5° C./min.

12. The process of claim 1, wherein the process further comprises, in a ramp up to the peak activation temperature, contacting the supported chromium catalyst with a gas stream comprising air or a mixture of air and an inert gas up to a temperature T1 in a range from 260° C. to 480° C.

13. The process of claim 12, wherein the process further comprises, in the ramp up to the peak activation temperature, contacting the supported chromium catalyst with the gas stream comprising from 25 to 60 vol % oxygen from the temperature T1 to the peak activation temperature.

14. The process of claim 1, wherein the process further comprises, in a cool down from the peak activation temperature, contacting the activated chromium catalyst with a gas stream comprising from 20 to 60 vol % oxygen to a temperature T1 in a range from 260° C. to 480° C.

15. An olefin polymerization process, the process comprising:
   (i) contacting a supported chromium catalyst with a gas stream comprising from 25 to 60 vol % oxygen at a peak activation temperature of from 550° C. to 900° C. to produce an activated chromium catalyst; wherein:
   a linear velocity of the gas stream is in a range from 0.18 to 0.4 ft/sec; and
   an oxygen linear velocity of the gas stream is in a range from 0.05 to 0.15 ft/sec; and (ii) contacting the activated chromium catalyst and an optional co-catalyst with an olefin monomer and an optional olefin comonomer in a polymerization reactor system under polymerization conditions to produce an olefin polymer.

16. The process of claim 15, wherein the olefin monomer comprises ethylene.

17. The process of claim 15, wherein the activated chromium catalyst is contacted with ethylene and an olefin comonomer comprising 1-butene, 1-hexene, 1-octene, or a mixture thereof.

18. The process of claim 15, wherein the polymerization reactor system comprises a slurry reactor, a gas-phase reactor, a solution reactor, or a combination thereof.

19. The process of claim 15, wherein the polymerization reactor system comprises a loop slurry reactor.

20. The process of claim 19, wherein the olefin polymer comprises an ethylene homopolymer, an ethylene/1-butene copolymer, an ethylene/1-hexene copolymer, and/or an ethylene/1-octene copolymer.

* * * * *